(12) United States Patent
Jadunandan et al.

(10) Patent No.: US 9,753,800 B1
(45) Date of Patent: Sep. 5, 2017

(54) COMMUNICATION NETWORK OPERATIONS MANAGEMENT SYSTEM AND METHOD

(71) Applicant: Sprint Communications Company L.P., Overland Park, KS (US)

(72) Inventors: Kevin V. Jadunandan, Palm Bay, FL (US); Shane A. Lobo, Ponte Verde, FL (US); Robert D. Lumpkins, Marietta, GA (US); Brian D. Lushear, Winter Springs, FL (US); P. A. Shinholster, Jr., Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 112 days.

(21) Appl. No.: 14/920,874

(22) Filed: Oct. 23, 2015

(51) Int. Cl.
G06F 11/00 (2006.01)
G06F 11/07 (2006.01)
H04L 12/24 (2006.01)

(52) U.S. Cl.
CPC ........ G06F 11/079 (2013.01); G06F 11/0709 (2013.01); G06F 11/0751 (2013.01); G06F 11/0787 (2013.01); G06F 11/0793 (2013.01); H04L 41/06 (2013.01); H04L 41/22 (2013.01)

(58) Field of Classification Search
CPC ............... G06F 11/079; G06F 11/0709; G06F 11/0751; G06F 11/0787; G06F 11/0793; H04L 41/06; H04L 41/22
See application file for complete search history.

(56) References Cited

U.S. PATENT DOCUMENTS

| 2006/0233310 A1* | 10/2006 | Adams, Jr. .......... H04L 12/2697 379/2 |
| 2008/0181100 A1* | 7/2008 | Yang .................... H04L 41/0681 370/216 |
| 2016/0179598 A1* | 6/2016 | Lvin ...................... G06F 11/079 714/48 |

OTHER PUBLICATIONS

Gonzalez, Jose A., et al., entitled, "Enhanced Node B (eNB) Backhaul Network Topology Mapping," filed Apr. 26, 2016, U.S. Appl. No. 15/139,293.

* cited by examiner

Primary Examiner — Philip Guyton

(57) ABSTRACT

A communication network operations center (NOC) management system. The system comprises a network equipment performance data store, an equipment fault data store, an equipment inventory data store, an equipment trouble history data store, and a knowledge data store. The system further comprises a computer system that executes a NOC management application. The NOC management application opens new network equipment trouble cases and analyzes the trouble cases based on data in the data stores. Based on the analysis, the application identifies an information pattern shared by the new trouble case and a resolved trouble case stored in the history data store. The application automatically executes a control command on a network equipment item identified in the new network equipment trouble case based on a resolution action identified in the resolved trouble case stored in the history data store with the shared information pattern.

20 Claims, 9 Drawing Sheets

COMMUNICATION NETWORK OPERATIONS MANAGEMENT SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication network may comprise a radio access network (RAN) and a core network which are communicatively coupled to one another. The RAN and core network may be maintained by a service provider and comprise a variety of network equipment items. These network equipment items in the service provider network may be manufactured by different vendors and original equipment manufacturers (OEMs). Network management systems (NMSs) or element management systems (EMSs) that are provided by different vendors to manage these items of network equipment may use different formats to represent state of the network equipment and have different operating procedures that differ from equipment item to equipment item, from a first EMS to a second EMS, or from a first NMS to a second NMS. When an issue arises on the service provider network, it may be difficult, inefficient, and time consuming to gather information such as vendor documents and experiment with methods to resolve the problem. Contributors assigned to troubleshoot the issue may be unfamiliar with the network equipment element and/or the nature of the issue that has occurred. The time spent on the trouble case may lead to more money and resources being spent by a company to fix the problem.

SUMMARY

In an embodiment, a communication network operations center (NOC) management system is disclosed. The NOC management system comprises a network equipment performance data store comprising network equipment performance data collected from at least one network equipment performance monitoring system, a network equipment fault data store comprising network equipment fault data collected from at least one network equipment fault monitoring system, a network equipment maintenance data store comprising maintenance data identifying maintenance activity for network equipment items, a network equipment inventory data store that is updated daily comprising at least three of an identification of network equipment items, an identification of vendors of the network equipment items, a software version identity of the network equipment items, a hardware version identity of the network equipment items, a firmware version identity of the network equipment items, and a topological relationship of the network equipment items to other network equipment items, a customer complaint data store comprising reports of communication network customer complaints, a network equipment trouble history data store comprising a plurality of case histories of a network equipment item trouble, a communication network knowledge data store comprising vendor network equipment item product descriptions, vendor procedures for network equipment items, vendor recommendations for fixing network equipment items faults, and communication network service provider documentation of troubleshooting procedure, and a computer system comprising a processor, a non-transitory memory, and a network operations center (NOC) management application stored in the non-transitory memory. Upon execution by the processor, the NOC management application opens a new network equipment trouble case based on at least one of network equipment fault data, a customer complaint, and network equipment performance data, analyzes the network equipment trouble case based on the network equipment data store and the resolved network equipment trouble case histories stored in the network equipment trouble history data store, identifies an information pattern shared by the new network equipment trouble case and at least one of the resolved network equipment trouble case histories, and automatically executes a control command on the network equipment associated with the new network equipment trouble case based on the identification of a resolution action associated with the one or more resolved network equipment trouble case histories.

In an embodiment, a communication network operations center (NOC) management system is disclosed. The communication NOC management system comprises of a network equipment fault data store comprising network equipment fault data collected from at least one network equipment fault monitoring system, a network equipment maintenance data store comprising maintenance data identifying maintenance activity for network equipment items, a network equipment inventory data store comprising at least three of an identification of the network equipment items, an identification of vendors of the network equipment items, a software version identity of the network equipment items, a hardware version identity of the network equipment items, a firmware version identity of the network equipment items, and a topological relationship of the network equipment items to other network equipment items, a network equipment trouble history data store comprising a plurality of case histories of a network equipment item trouble, a communication network knowledge data store comprising vendor equipment item product description, vendor procedures for network equipment items, vendor recommendations for fixing network equipment item faults, and communication network service provider documentation of troubleshooting procedures, and a computer system comprising a processor, a non-transitory memory, and a NOC management application stored in the non-transitory memory. Upon execution by the processor, the management application opens a new network equipment trouble case based on the new network equipment fault data, analyzes the network equipment trouble case based on the network equipment inventory data store and the resolved network equipment trouble case histories stored in the network equipment trouble history data store, identifies an information pattern shared by the new network equipment trouble case and at least one of the resolved network equipment trouble case histories, creates a troubleshooting workflow based on the information pattern and based on at least one of the vendor network equipment item product descriptions, the vendor procedures for network equipment items, the vendor recommendations for fixing network equipment item faults, and the communication network service provider documentation of troubleshooting procedures, and presents the troubleshooting workflow on a user interface, whereby a NOC operator is led through a process of troubleshooting and fixing the network equipment identified in the new network equipment trouble case.

In an embodiment, a communication network operations center (NOC) management system is disclosed. The communication network operations center (NOC) management system comprised of a network equipment inventory data store comprising at least three of an identification of the network equipment items, a software version identity of the network equipment items, a hardware version identity of the network equipment items, a firmware version identity of the network equipment items, and a topological relationship of the network equipment items, a network equipment trouble history data store comprising a plurality of case histories of a network equipment trouble, a communication network knowledge data store comprising vendor network equipment item product descriptions, vendor procedures for network equipment items, vendor recommendations for fixing network equipment item faults, and communication network service provider documentation of troubleshooting procedures, and a computer system comprising a processor, a non-transitory memory, and a network operations center (NOC) management application stored in the non-transitory memory. Upon execution by the processor, the management application opens a new network equipment trouble case, analyzes the new network equipment trouble case, identifies a network support person identified in one of the resolved network equipment trouble case histories, associates the network support person with the new network equipment trouble case with a consulting role, identifies at least a second network support person associated with an item of network equipment identified in the new network equipment trouble case based on at least one of a location, an equipment category, or a communication technology of the item of network equipment, and associates at least the second network support person with the new network equipment trouble case in a monitoring role. The application further analyzes the new network equipment trouble case, based on the analysis of the topological relationship and based on the new network equipment troubles case, identifies vendor procedure for the network equipment item identified in the new network equipment trouble case, based on the new network equipment trouble case, identifies communication network service provider documentation of troubleshooting procedures, and presents the identified vendor procedures and the identifies communication network service provider documentation of the troubleshooting procedures.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
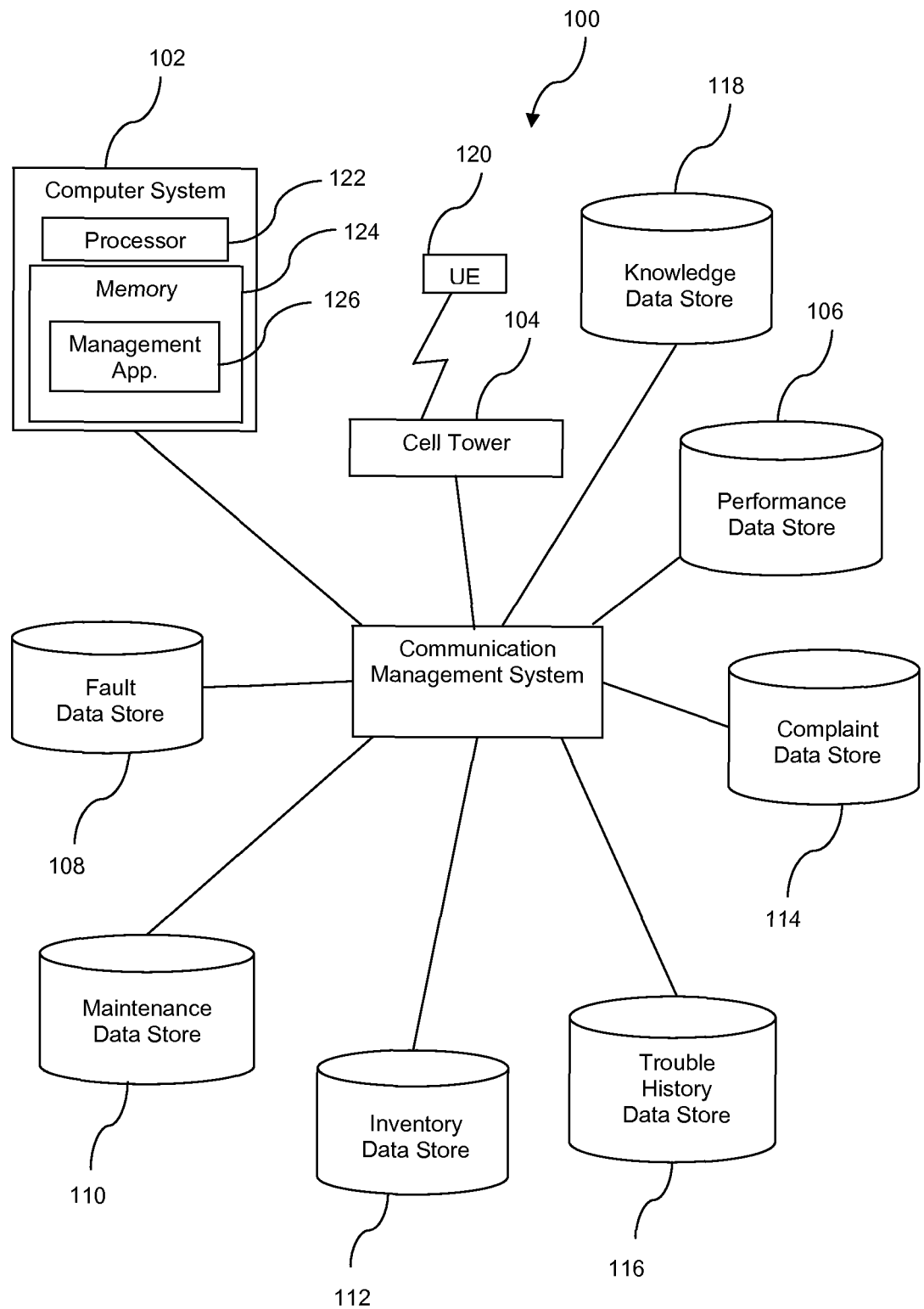
FIG. 1 is an illustration of a communication management system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A telecommunications service provider may operate and manage network elements manufactured by different vendors or original equipment manufacturers (OEMs). Network elements from the different vendors may use their own technology and have their own unique operating and/or troubleshooting procedures and instructions. The disclosed communication network operation center (NOC) management system integrates information about all network elements to one place so that previous occurrences such as trouble case histories, software/hardware/firmware version identities, customer complaints, vendor instructions and procedures, relationships with other network elements, and participation history with the network element can be found with one search from a single tool interface. Combining data relevant to a case can streamline the troubleshooting process and reviewing the history of the network element.

The NOC management system consolidates information resources and improves network operation productivity. The NOC management system gathers all information related to a network equipment item and selects the data relevant to an issue at hand. It uses information and status updates collected continuously on a network equipment item in a service provider network. The information collected may include vendor documentation, decision trees, and processes that may be used to fix the issue, which would encourage uniform and consistent responses to other network issues in the future. The tool could automate responses and resolution actions of a network equipment element or multiple network equipment elements that would correct the issue at hand. This reduces the amount of resources—support persons and aggregate labor time—used to solve a network issue.

For example, a cell tower may be experiencing a network outage. The communication NOC management system would combine the history of the cell tower from the plurality of data stores and filter out information irrelevant to this case. With only the relevant information regarding this cell tower, the system may suggest and invite participants who have previously worked on this cell tower and also invite participants who have worked on similar network outages to help to resolve the problem. The system may suggest and invite observers to monitor the problem troubleshooting and resolution, for example when the observers are responsible for maintaining different but related equipment (equipment in the same region, equipment of the same type but in a different region, equipment of the same wireless communication protocol type as the equipment experiencing the current issue). Observers may learn from monitoring the troubleshooting and resolution of the problem. The suggested participants may expedite the process of resolving the issue due to their experience with the network element and problem. The system may also act as a tool and provide a procedure and/or a workflow that network operations center (NOC) operator may carry out to resolve the issue. The procedure may be described by vendor instructions regarding the issue and/or procedures that have been taken in the past to resolve a similar issue. The system may also automatically implement a solution in the network equipment item. For example, a fault about a network equipment item may have occurred several times in the past and has been resolved in the past. The tool stores information of successful resolution actions of the trouble case and automatically executes commands to remedy the problem remotely and without the need to manually intervene to solve the problem. The automated actions could be to reset or reboot the network equipment item or to change parameters of the network equipment item.

For example, a plurality of cell towers within a specific geographical radius may be experiencing a fault. The specific geographical radius may be one mile, five miles, ten miles, fifty miles, or any other specified radial distance. The tool would be able to detect that this plurality of cell towers shares a relationship with an internet protocol aggregator (IPA) that provides a backhaul service to the plurality of cell towers. The tool would identify that the IPA is experiencing a fault which in turn is causing the plurality of cell towers to experience a fault. Instead of spending additional time on repairing the cell tower, employees or contractors of the service provider and NOC operators may direct their attention to the IPA. The tool would also collect information regarding the IPA including the history of the IPA and vendor procedures and recommendations for the IPA.

The NOC management system may receive a triggering event, such as a performance metric exceeding a predefined threshold, and open a trouble case on network equipment related to the performance metric (e.g., a cell tower). The system can automatically compare facts related to the instant trouble (equipment vendor, equipment model, equipment software version, equipment hardware version, equipment firmware version, key performance indicators associated with the equipment, and the like) to corresponding facts of previously resolved trouble case histories. When one or more similar trouble case histories are found, the system can automatically determine support persons who may have resolved the subject trouble case and assign them to the current trouble case. The system can also select relevant vendor documents and vendor troubleshooting flows and present them and/or link them to the new trouble case so other support persons working the case will find them collected with other information about the new trouble case. The system can further invite other support persons to monitor, in an observer's role, the progress of the new trouble case, so that these other support persons may learn from the activity.

The system supports the ability of a support person to work the trouble cases from a single tool and to access all the needed information quickly. This is in contrast to the prior systems in which the support person would have to use multiple different tools to find similar information and would have to search themselves for relevant historic information rather than having it automatically located for them. The system can provide suggested solutions pulled from the integrated data and from a command rules set which can be executed, through the system, to remotely address various potential solutions in the network equipment. It is further contemplated that the system may be able to automatically analyze trouble case histories to infer automated action rules and configure these automated action rules for future trouble cases. Said in other words, the system can learn autonomously and synthesize automated corrected actions that are triggered responsive to recurrence of similar trouble case fact patterns.

Turning now to FIG. 1, a communication NOC management system 100 is described. In an embodiment, the system 100 comprises a computer system 102, a cell tower 104, and a plurality of data stores in which collected data is stored. The plurality of data stores includes a network equipment performance data store 106, a network equipment fault data store 108, a network equipment maintenance data store 110, a network equipment inventory data store 112, a customer complaint data store 114, a network equipment trouble history data store 116, and a communication network knowledge data store 118. The performance data store 106 stores data regarding network equipment performance collected by the system 100 from at least one network equipment performance monitoring system. The fault data store 108 stores data regarding network equipment faults collected by the system 100 from at least one network equipment fault monitoring system.

The network equipment fault data may be collected from any number of network equipment performance monitoring systems, for example, from at least three different network equipment performance monitoring systems. Each of these three performance monitoring systems may be provided by a different vendor of network communication equipment. The maintenance data store 110 stores maintenance data collected by the system 100 identifying recently performed, in-progress, and scheduled future maintenance activities for network equipment items.

The inventory data store 112 stores data collected by the system 100 about three or more of a variety of identifications and identities of network equipment items, vendors, and software versions, hardware versions, and firmware versions as well as topological relationships of network equipment items to one another. In an embodiment, the data in the inventory data store 112 may be updated daily. The complaint data store 114 stores data collected by the system 100 regarding reports of customer complaints relating to the communication network. These complaints may originate from tickets created by customer service and other methods of inputting customer issues.

The trouble history data store 116 stores data collected by the system 100 regarding trouble case histories of a network equipment item. The trouble case histories may comprise active trouble case histories that have not been resolved and previously resolved case histories, where the resolved case histories comprise an identification of the problem, an identification of the network equipment item, and an identification of the resolution action. The trouble case histories may identify support personnel engaged in working on the problem. The trouble case histories may comprise an activity log that tracks actions taken by one or more support persons assigned and/or associated with the trouble case. The activity log may tag one or more support persons who provided the trouble solution or fix for the underlying problem or failure that drives the trouble case. Support personnel and/or support persons may be NOC operators, field service technicians, RF engineers, or other technical workers. The information about support personnel who have worked on resolved trouble cases can be used by the management application 126 to identify key personnel to assign to or associate to unresolved trouble cases that share one or more similarities to the resolved trouble cases.

The cell tower 104 may be communicatively coupled to a user equipment (UE) 120 or a plurality of UEs 120 via radio communication links. The UEs 120 may be mobile telecommunications devices, smart phones, personal digital assistants (PDAs), media players, wearable computers, headset computers, laptop computers, tablet computers, notebook computers, desktop computers, or other communication enabled portable electronic devices.

While a single cell tower 104 and a single UE 120 are illustrated in FIG. 1, it is understood that the system 100 may comprise any number of UEs 120 and any number of cell towers 104. The totality of cell towers 104 may be said to be a part of a radio access network (RAN), which couples with UEs 120 to the cell towers 104. The cell tower 104 may establish wireless communication links with the UE 120 according to at least one of a long term evolution (LTE) wireless communication protocol, a code division multiple access (CDMA), a global system for mobile communications (GSM), a worldwide interoperability for microwave access (WiMAX) wireless communication protocol, or another wireless communication protocol. The cell towers 104 comprise network elements further discussed hereinafter in FIG. 2.

The computer system 102 comprises a processor 122 and a memory 124 comprising a network operations center (NOC) management application 126. In some contexts, the memory 122 may be referred to as a non-transitory memory. When executed by the processor, the management application 126 opens or creates a new network equipment trouble case based on data collected from at least one of fault data store 108, complaint data store 114, and performance data store 106. The management application 126 analyzes the case based on previously collected data from the inventory data store 112 and previously resolved trouble cases stored in the trouble history data store 116. The data analyzed from the inventory data store 112 may be a version number of the software currently running on the network equipment item and/or the association of the network equipment item to another network equipment item. The data analyzed from the one or more resolved trouble cases may come from similar issues that have been resolved on at least one of the other network equipment items or the same network equipment items in the past. The data may include previous participants who helped resolve the trouble case, the method that was taken to resolve the one or more trouble case histories, and methods that did not function efficiently to resolve the one or more trouble case. The management application 126 detects a pattern of information shared by the newly opened trouble case and one or more resolved trouble case histories from the trouble history data store 116. The application 126 may automatically execute a command on the network equipment associated with the newly opened trouble case based on the resolution action associated with the one or more resolved trouble case histories. The automatic response may be automatically resetting or rebooting an element, automatically gathering information such as counting the current number of calls and/or counting the current number of emergency calls, automatically changing certain parameters such as remotely changing the angle of tilt of an antenna and the amount of power of the transmission, and automatically confirming when a performance improvement occurs.

Figure 2:
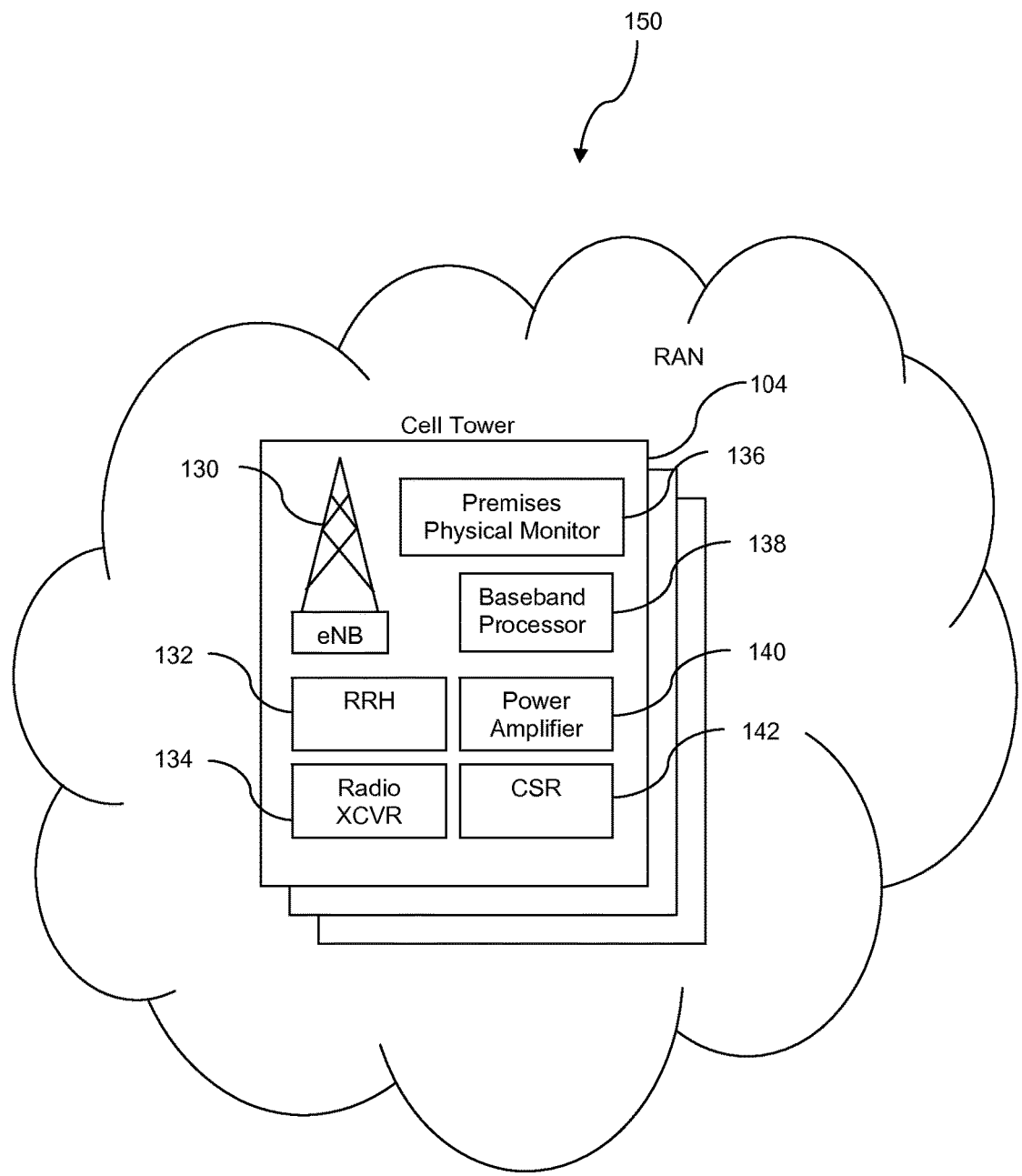
FIG. 2 is an illustration of a cell tower according to an embodiment of the disclosure.

Turning now to FIG. 2, a radio access network 150 is described. In an embodiment, radio access network 150 comprises a plurality of cell towers 104. The cell tower 104 may further comprise an enhanced node B (eNB) 130, a remote radio head (RRH) 132, a radio transceiver 134, a premises physical monitor 136, a baseband processor 138, a power amplifier 140, and a cell site router (CSR) 142. The radio transceiver 134 may be used to communicatively couple the UE 120 with the cell tower 104 according to a long term evolution (LTE), a code division multiple access (CDMA), a global system for mobile communications (GSM), worldwide interface for microwave access (WiMAX), or another wireless telecommunication protocol. The UEs 120 may be mobile telecommunications devices, smart phones, personal digital assistants (PDAs), media players, wearable computers, headset computers, laptop computers, tablet computers, notebook computers, or desktop computers. In some contexts, the eNB 130 may be referred to as a base transceiver station (BTS). The baseband processor 138 may manage the radio functions and signal transmissions that occur in the cell tower 104. While FIG. 2 only depicts one cell tower 104 comprising one enhanced node B (eNB) 130, one remote radio head (RRH) 132, one radio transceiver 134, one premises physical monitor 136, one baseband processor 138, one power amplifier 140, and one cell site router (CSR) 142, it is understood that in some embodiments, a radio access network 150 may comprise any number of cell towers 104, each of which may comprise a plurality of an enhanced node B (eNB) 130, a remote radio head (RRH) 132, a radio transceiver 134, a premises physical monitor 136, a baseband processor 138, a power amplifier 140, and a cell site router (CSR).

Figure 3:
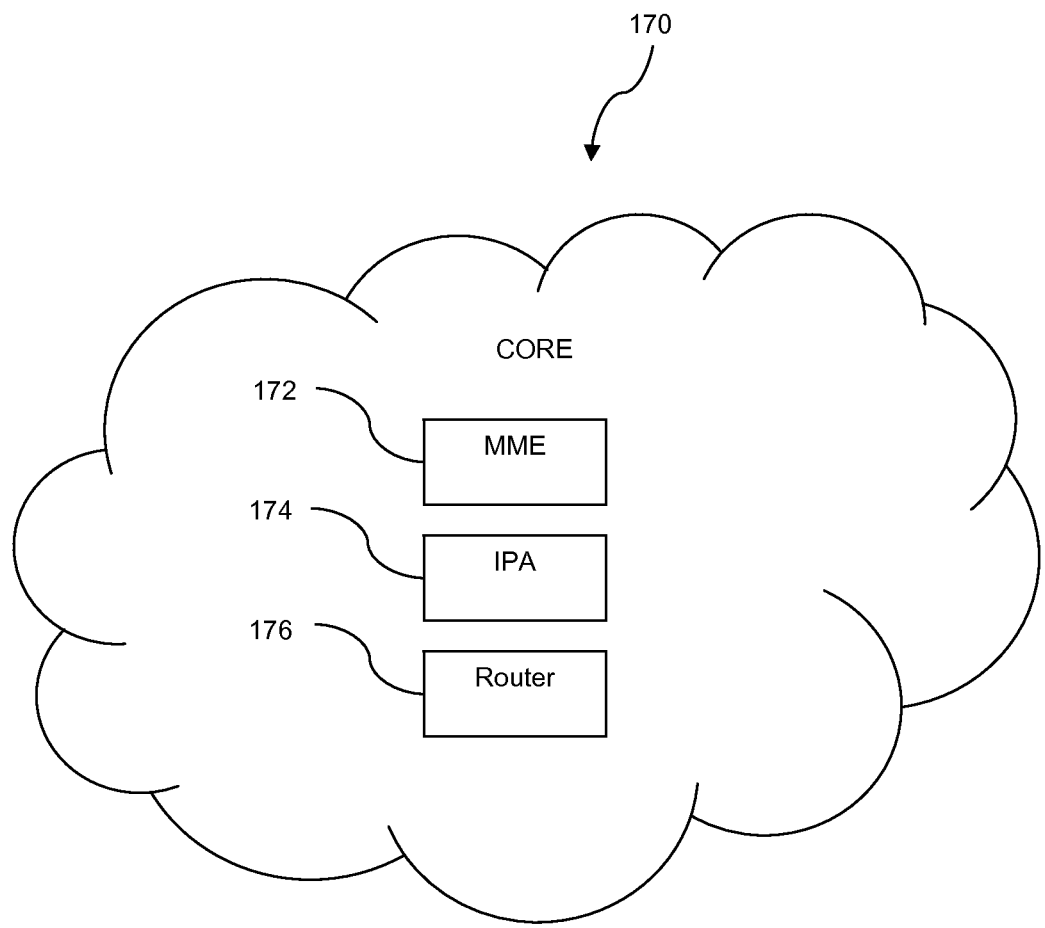
FIG. 3 is an illustration of a core network according to an embodiment of the disclosure.

Turning now to FIG. 3, the core network 170 is described. The core network 170 comprises of a mobility management entity (MME) 172, an internet protocol aggregator (IPA) 174, a router 176, or any combination of two or more of these core network equipment items. While only one MME 172, one IPA 174, and one router 176 are illustrated in FIG. 3, it is understood that a core network 170 may comprise of any number of MMEs 172, IPAs 174, and routers 176. Additionally, it is understood that the core network 170 may comprise a plurality of other core elements and/or core equipment items. The core network 170 provides a number of communication services. For example, the core network 170 authenticates UEs 120 that may be attempting to connect to the core network 170 via the radio access network 150, mobility management services, and premium connection services. The IPAs 174 may provide a backhaul service for a plurality of cell towers 104.

Figure 4:
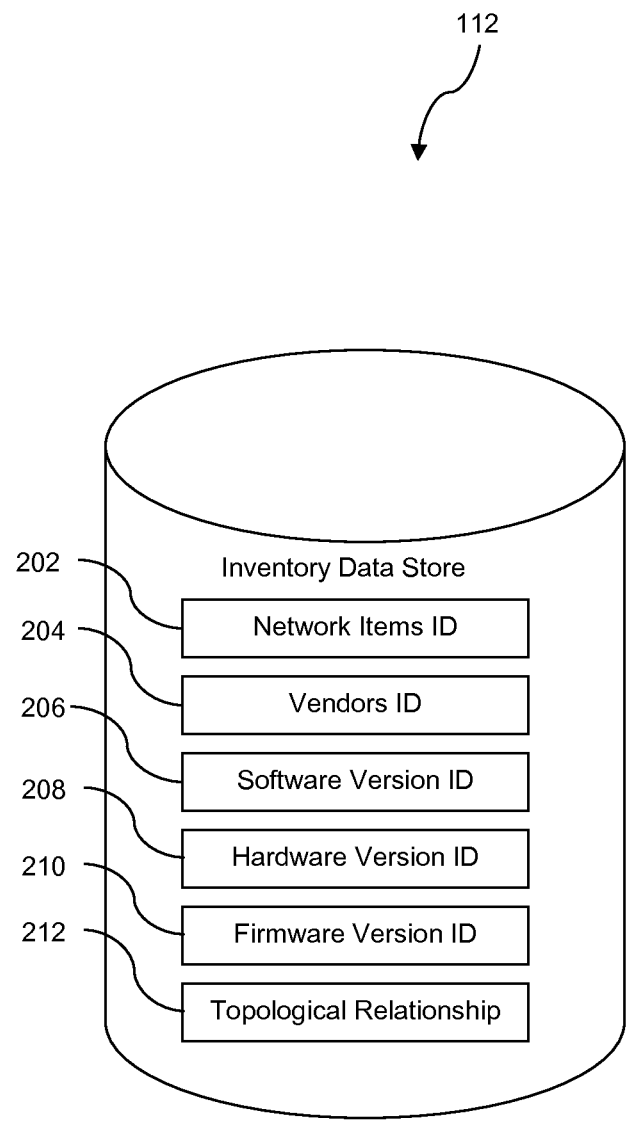
FIG. 4 is a block diagram of an inventory data store according to an embodiment of the disclosure.

Turning now to FIG. 4, an inventory data store 112 is described. In an embodiment, inventory data store 112 comprises at least three of an identification of network equipment items 202, an identification of vendors 204 of network equipment items, a software version identity 206 of network equipment items, a hardware version identity 208 of network equipment items, a firmware version identity 210 of network equipment items, and a topological relationship 212 of a network equipment item to other network equipment items.

Figure 5:
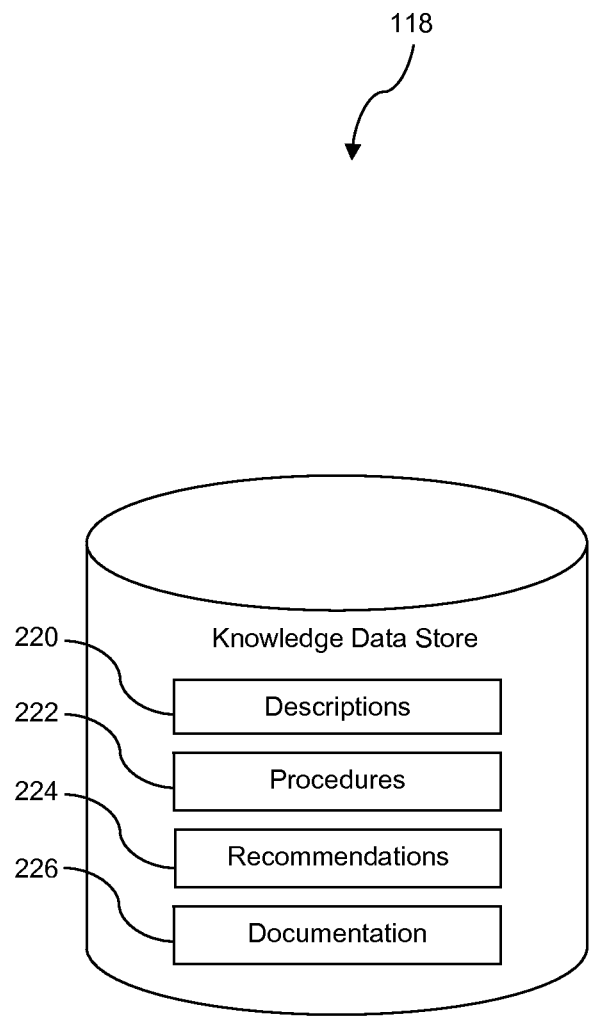
FIG. 5 is a block diagram of a knowledge data store according to an embodiment of the disclosure.

Turning now to FIG. 5, a knowledge data store 118 is described. In an embodiment, knowledge data store 118 comprises vendor network equipment item product descriptions 220, vendor network equipment items procedures 222, vendor recommendations 224 for fixing network equipment items, and communication network service provider documentation 226 of troubleshooting procedures.

In an embodiment, data structures from all network equipment items are transcoded to a common database table of normalized data structures with an additional column containing information unique to a particular language format such as extensible markup language (XML) format, comma separated value (CSV) format, and any other format. The performance data store 106 of the management system 100 continuously collects and monitors data from the plurality of data stores and produces a triggering event in the management application 126 when a predefined amount of alarms are active. This can be five alarms, ten alarms, fifty alarms, one hundred alarms, or any other predefined number of alarms.

In an embodiment, the triggering event may be produced when a number of alarms are exceeded within a predefined time period. The time period may be one hour, one day, one week, one month, or any other predefined time period. For example, the alarms may come from a number of fault data from the fault data store 108, customer complaint data from the complaint data store 114, and/or performance data from the performance data store 106 about a network equipment item filed in a one week time period. The triggering event would cause the computer system 102 to gather data to the event concerning the network equipment item and alarms from a trouble history data store 116 and a knowledge data store 118.

The data also comprises the entire history of the network equipment item such as all previous participants and actions performed on the network equipment item. The computer system 102 analyzes the data and only displays, on a user interface, the data relevant to this trouble case. The user interface may be a web page presented on a workstation display screen. The user interface may provide access to the network equipment fault data, maintenance data, inventory data, and network equipment trouble case histories. The user interface may further provide access to knowledge data in the knowledge data store 118, to performance data in the performance data store 106, and to customer complaint data in the complaint data store 114. The relevant data may be data from the knowledge data store 118 concerning the procedures 222 and recommendations 224 regarding the vendor of this network equipment item and past participants who are familiar with resolving the issue and/or familiar with the network equipment item.

The computer system 102 may filter out the unrelated data and display only the information described above and suggest potential solutions and invite participants to the new trouble case. For example, if a support team has been assigned to the case, but the computer system 102 determines that an independent individual has experience with the fault or network element, then the system 102 would include, assign, or invite this individual to join with the support team as a participant in resolving the new trouble case. The suggestions may be executed remotely through the management system 100 to resolve the issue associated with the new trouble case.

For example, the management application 126 may identify a network support person who is identified in one of the resolved network equipment trouble case histories, where the resolved network equipment trouble case history shares some common information with the new network equipment trouble case (e.g., resolved case history fits a pattern that is present in the new trouble case). The management application 126 may then assign or associate the network support person with the new network equipment trouble case with a consulting or a participant role. In this way, the trouble case may potentially be resolved more quickly, based on reusing a solution previously discovered and proved by this network support person.

The user interface may provide controls for executing commands on the network equipment items depending on the privileges granted to a user associated with the case that is logged into the user interface. The management system 100 records and saves data regarding the action that successfully resolves the new trouble case and proceeds to move the new trouble case into the trouble history data store 116 as a resolved trouble case.

The computer system 102 and/or the application 126 can identify additional individuals (e.g., other support persons or technicians) associated with an item of network equipment identified in the new trouble case and associate those other individuals to the new trouble case in a monitoring role or in a following role. The additional individuals may be selected based on at least one of a location, an equipment category, or a communication technology of the item of network equipment. For example, one or more of the additional individuals may work on network equipment located in the same region or general location that the equipment identified in the new trouble case; one or more of the additional individuals may be assigned to work with equipment in an equipment category to which the equipment identified in the new trouble case belongs; one or more of the additional individuals may be assigned to work with equipment of the same communication technology as the equipment identified in the new trouble case. The monitoring of the troubleshooting and resolution of the new trouble case by the additional individuals may promote valuable learning for those individuals.

The triggering event may be related to a topological relationship between network equipment items and other network equipment items. For example, the management system 100 may detect a pattern of a plurality of cell towers 104 experiencing a fault at the same time, where the same IPA 174 provides the backhaul service to these cell towers 104, and the IPA 174 is experiencing a fault.

In an embodiment, a support person working on a network equipment trouble case may use a workstation that provides a user interface to use the management application 126 to troubleshoot and or resolve the trouble case. The management application 126 may create a troubleshooting workflow based on the information pattern associated with the trouble case and based on at least one of the vendor network equipment item product descriptions 220, the vendor procedures for network equipment items (accessed from vendor network equipment item procedures 222), the vendor recommendations 224 for fixing network equipment item faults, and the communication network service provider documentation 226 of troubleshooting procedures. For example, the workflow may describe a series of steps to take and alternative actions based on the results of the steps. The interface of the workstation may present the workflow to the support person and allow them to step through the steps and workflow on a computer screen. In this way a support person or other NOC operator may be lead through a process of troubleshooting and fixing the network equipment identified in the trouble case.

In an embodiment, a triggering event may be resolved by an automated response by the computer system 102 of the management system 100. When the computer system 102 receives a new trouble case that is identical or similar to a resolved trouble case when the computer system 102 compares the new trouble case to a resolved trouble case from the trouble history data store 116, the system 102 determines based on the historical data to automate an implementation of a solution on the network equipment item. If the automated solution successfully resolves the issue, the result is documented in the trouble history data store 116. If the automated solution does not successfully resolve the issue, the NOC management system 100 restores the network equipment item back to its original state before the automated response was implemented. The automated response may include causing a network equipment to reset or reboot. Other automated actions may be counting the number of current calls, counting the number of emergency calls, changing parameters of the network equipment items such as changing the angle of tilt of an antenna and changing the power of the transmission, and automatically notifying a technician about a failed component that needs to be replaced.

In an embodiment, the management application 126 analyzes the new network equipment trouble case based on a topological relationship of a network equipment item identified in the new network equipment trouble case to other network equipment items stored in the network equipment inventory data store 112. Based on the analysis of the topological relationship and based on the new network equipment trouble case, the management application 126 may further identify vendor procedures 222 for the network equipment item identified in the new network equipment trouble case. Based on the new network equipment trouble case, the management application 126 may identify communication network service provider documentation 226 of troubleshooting procedures. The management application 126 may then present the identified vendor procedures and the identified communication network service provider documentation of troubleshooting procedures on the user interface, whereby a NOC operator is provided with documentation and procedures for troubleshooting and fixing the network equipment item identified in the new network equipment trouble case.

Figure 6:
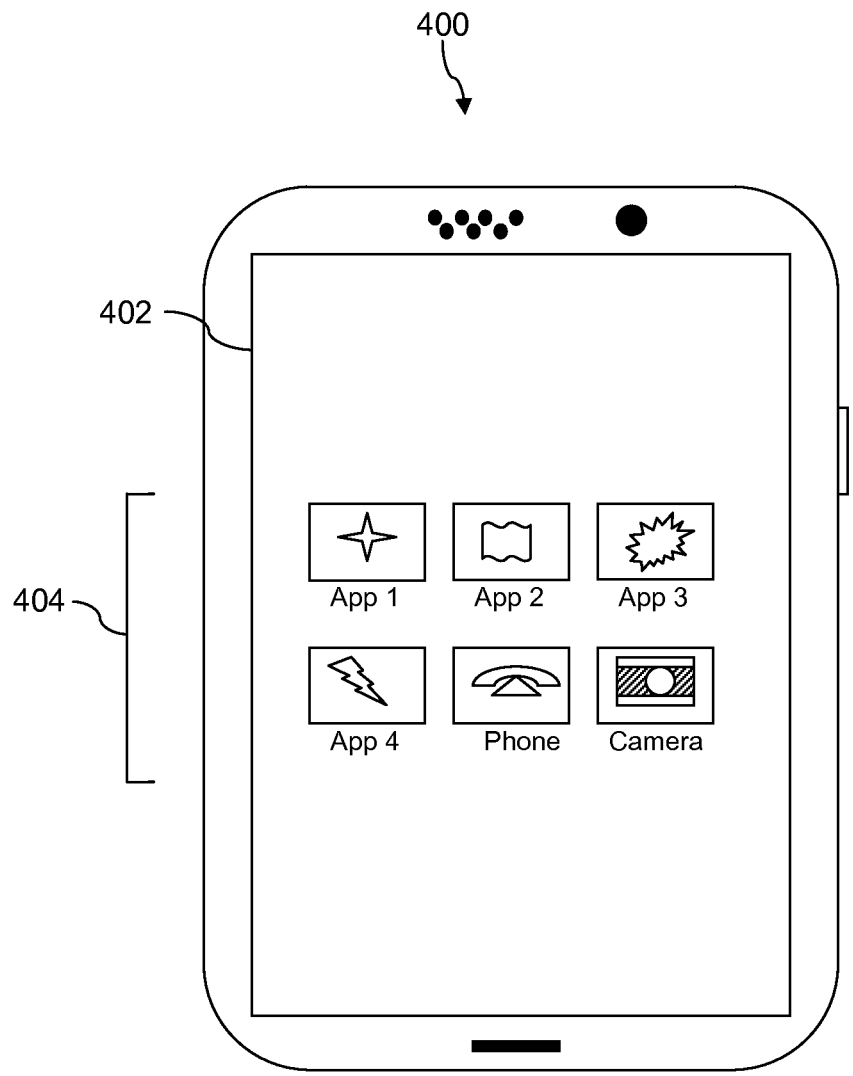
FIG. 6 is an illustration of a user equipment (UE) according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
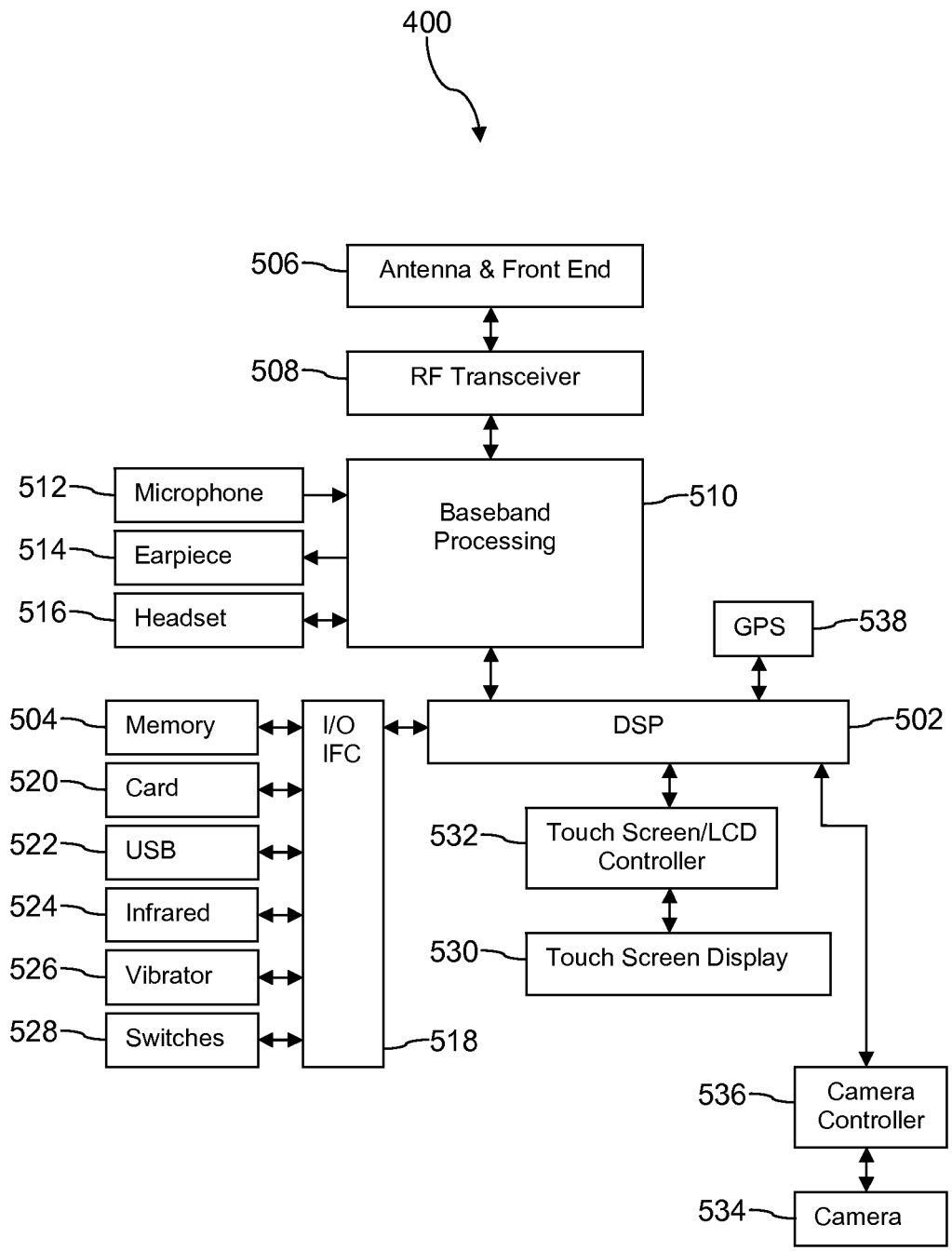
FIG. 7 is a block diagram of a user equipment (UE) according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
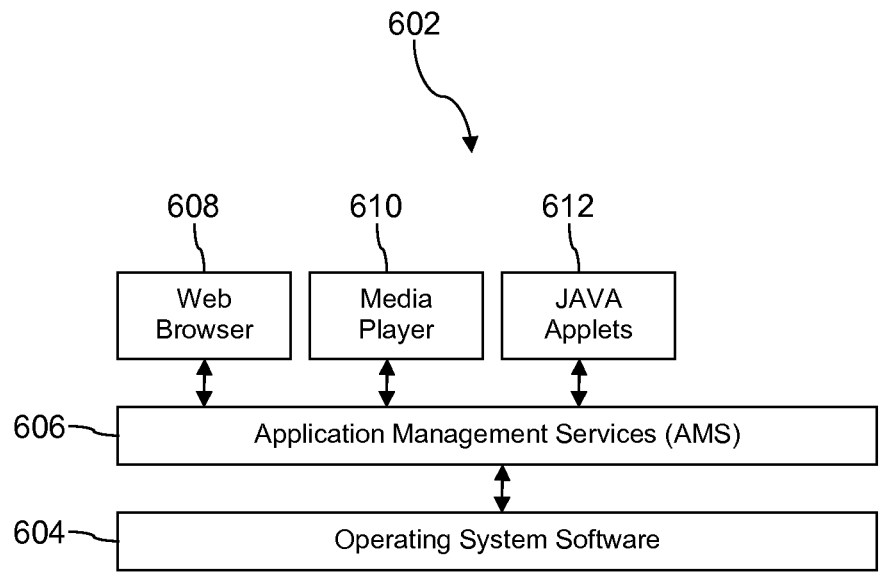
FIG. 8A is a block diagram of a software architecture of a user equipment (UE) according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
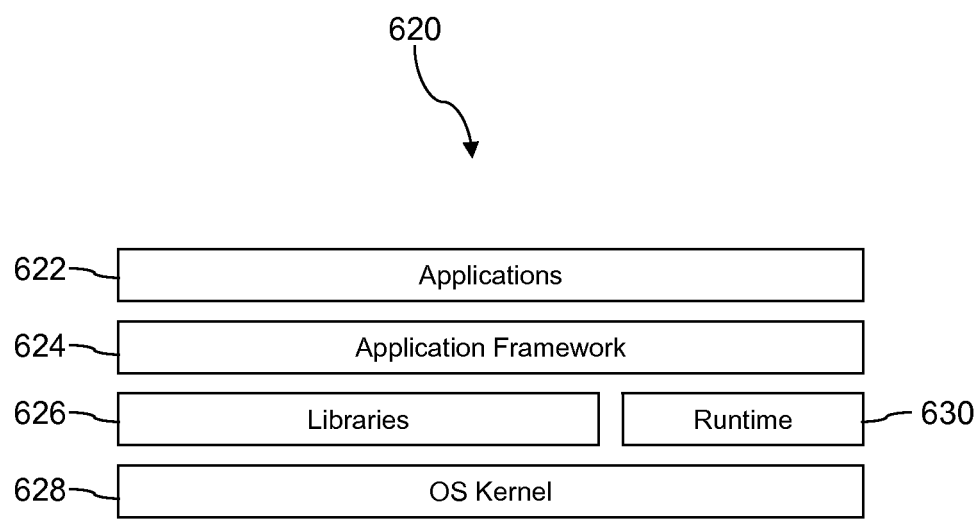
FIG. 8B is a block diagram of another software architecture of a computer system according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
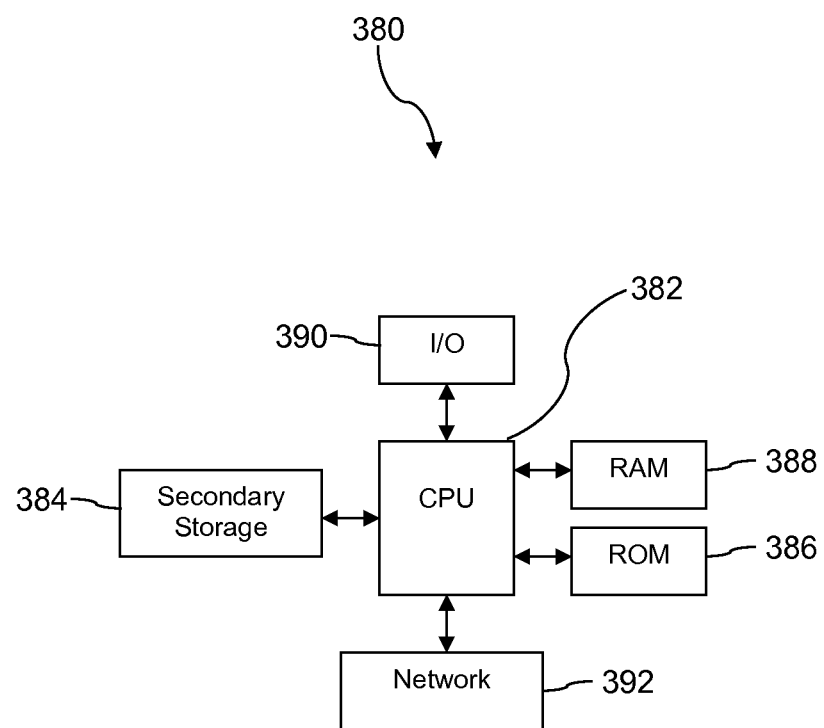
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication network operations center (NOC) management system, comprising:
    a network equipment performance data store comprising network equipment performance data collected from at least one network equipment performance monitoring system;
    a network equipment fault data store comprising network equipment fault data collected from at least one network equipment fault monitoring system;
    a network equipment maintenance data store comprising maintenance data identifying maintenance activity for network equipment items;
    a network equipment inventory data store comprising at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items, wherein the network equipment inventory data store is updated daily;
    a customer complaint data store comprising reports of communication network customer complaints;
    a network equipment trouble history data store comprising a plurality of case histories of a network equipment item trouble, wherein the case histories comprise active network equipment trouble case histories and resolved network equipment trouble case histories, and wherein the resolved network equipment trouble case histories comprise an identification of the trouble, an identification of the network equipment item, and an identification of a resolution action;
    a communication network knowledge data store comprising vendor network equipment item product descriptions, vendor procedures for network equipment items, vendor recommendations for fixing network equipment item faults, and communication network service provider documentation of troubleshooting procedures; and
    a computer system comprising a processor, a non-transitory memory, and a network operations center (NOC) management application stored in the non-transitory memory that, when executed by the processor
    opens a new network equipment trouble case based on at least one of network equipment fault data, a customer complaint, and network equipment performance data,
    analyzes the new network equipment trouble case based on the network equipment inventory data store and the resolved network equipment trouble case histories stored in the network equipment trouble history data store,
    identifies an information pattern shared by the new network equipment trouble case and at least one of the resolved network equipment trouble case histories, and
    automatically executes a control command on the network equipment associated with the new network equipment trouble case based on the identification of a resolution action associated with the one or more resolved network equipment trouble case histories.

2. The communication NOC management system of claim 1, wherein the control command causes the network equipment to one or reset or reboot.

3. The communication NOC management system of claim 1, wherein the network equipment fault data store comprises network equipment fault data collected from at least three different network equipment performance monitoring systems.

4. The communication NOC management system of claim 3, wherein each of the at least three different network equipment performance monitoring systems is provided by a different vendor of network communication equipment.

5. The communication NOC management system of claim 1, wherein the network equipment comprises wireless communication cell towers.

6. The communication NOC management system of claim 5, wherein the network equipment comprises Internet Protocol Aggregators (IPAs), wherein at some of the IPAs provide backhaul service for a plurality of wireless communication cell towers.

7. The communication NOC management system of claim 1, wherein the information pattern comprises the coincidence of network equipment performance data indicating a degradation of the network equipment item identified in the new network equipment trouble case, network equipment fault data identifying the network equipment item identified in the new network equipment trouble case, and a report of communication network customer complaint associated with the network equipment item identified in the new network equipment trouble case.

8. A communication network operations center (NOC) management system, comprising:
    a network equipment fault data store comprising network equipment fault data collected from at least one network equipment fault monitoring system;
    a network equipment maintenance data store comprising maintenance data identifying maintenance activity for network equipment items;
    a network equipment inventory data store comprising at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items, wherein the network equipment inventor data store is updated daily;

a network equipment trouble history data store comprising a plurality of case histories of a network equipment item trouble, wherein the case histories comprise active network equipment trouble case histories and resolved network equipment trouble case histories, and wherein the resolved network equipment trouble case histories comprise an identification of the trouble, an identification of the network equipment item, and an identification of a resolution action;

a communication network knowledge data store comprising vendor network equipment item product descriptions, vendor procedures for network equipment items, vendor recommendations for fixing network equipment item faults, and communication network service provider documentation of troubleshooting procedures; and a computer system comprising a processor, a non-transitory memory, and a network operations center (NOC) management application stored in the non-transitory memory that, when executed by the processor;

opens a new network equipment trouble case based on new network equipment fault data, analyzes the new network equipment trouble case based on the network equipment inventory data store and the resolved network equipment trouble case histories stored in the network equipment trouble history data store, identifies an information pattern shared by the new network equipment trouble case and at least one of the resolved network equipment trouble case histories, creates a troubleshooting workflow based on the information pattern and based on at least one of the vendor network equipment item product descriptions, the vendor procedures for network equipment items, the vendor recommendations for fixing network equipment item faults, and the communication network service provider documentation of troubleshooting procedures, and presents the troubleshooting workflow on a user interface, whereby a NOC operator is lead through a process of troubleshooting and fixing the network equipment identified in the new network equipment trouble case.

9. The communication NOC management system of claim 8, wherein the user interface is a web page presented on a workstation display screen.

10. The communication NOC management system of claim 8, wherein the information pattern is a plurality of cell towers experiencing a fault at the same time, where the cell towers are provided with backhaul service by the same Internet Protocol Aggregator (IPA) and the IPA is experiencing a fault.

11. The communication NOC management system of claim 8, wherein the network equipment inventory data store comprises identification of contractors that provide service to network equipment, and wherein the troubleshooting workflow is created further based on the identification of a contractor that provided service to the network equipment item identified in the new network equipment trouble case.

12. The communication NOC management system of claim 8, wherein the user interface provides access to the network equipment fault data, to the maintenance data, to the inventory data, and to the network equipment trouble case histories.

13. The communication NOC management system of claim 8, wherein the user interface provides controls for executing commands on the network equipment items, wherein the presented controls are selected based on a privilege associated with a user logged into the user interface.

14. The communication NOC management system of claim 13, wherein the NOC management application logs commands executed in response to selection of the controls.

15. A communication network operations center (NOC) management system, comprising:

a network equipment inventory data store comprising at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items, wherein the network equipment inventor data store is updated daily;

a network equipment trouble history data store comprising a plurality of case histories of a network equipment item trouble, wherein the case histories comprise active network equipment trouble case histories and resolved network equipment trouble case histories, and wherein the resolved network equipment trouble case histories comprise an identification of the trouble, an identification of the network equipment item, and an identification of a resolution action;

a communication network knowledge data store comprising vendor network equipment item product descriptions, vendor procedures for network equipment items, vendor recommendations for fixing network equipment item faults, and communication network service provider documentation of troubleshooting procedures; and a computer system comprising a processor, a non-transitory memory, and a network operations center (NOC) management application stored in the non-transitory memory that, when executed by the processor;

opens a new network equipment trouble case, analyzes the new network equipment trouble case based on the network equipment inventory data store and the resolved network equipment trouble case histories stored in the network equipment trouble history data store, identifies a first network support person identified in one of the resolved network equipment trouble case histories, where the resolved network equipment trouble case history shares some common information with the new network equipment trouble case, associates the first network support person with the new network equipment trouble case with a consulting role, identifies at least a second network support person associated with an item of network equipment identified in the new network equipment trouble case based on at least one of a location, an equipment category, or a communication technology of the item of network equipment, associates at least the second network support person with the new network equipment trouble case in a monitoring role, analyzes the new network equipment trouble case based on a topological relationship of a network equipment item identified in the new network equipment trouble case to other network equipment items stored in the network equipment inventory data store, based on the analysis of the topological relationship and based on the new network equipment trouble case, identifies vendor procedures for the network equipment item identified in the new network equipment trouble case, based on the new network equipment trouble case, identifies communication network service provider documentation of troubleshooting procedures, and presents the identified vendor procedures and the identified communication network service provider documentation of troubleshooting procedures, whereby a NOC operator is provided with documentation and procedures for troubleshooting and fixing the network equipment item identified in the new network equipment trouble case.

16. The communication NOC management system of claim 15, wherein the common information comprises one of a same network equipment item identity, a same software version, a same hardware version, and a same firmware version.

17. The communication NOC management system of claim 15, wherein the NOC management application further identifies recent changes performed on the network equipment item identified in the new network equipment trouble case and presents the identified recent changes.

18. The communication NOC management system of claim 15, wherein the network equipment comprises three or more of remote radio heads (RRHs), power amplifiers, radio transceivers, baseband processors, power supplies, routers, and Internet protocol aggregators (IPAs).

19. The communication NOC management system of claim 15, further comprising a network equipment performance data store comprising network equipment performance data collected from at least one network equipment performance monitoring system, wherein the new network equipment trouble case is opened based on performance data associated with the network equipment item identified in the new network equipment trouble case and the new network equipment trouble case is further analyzed based on the performance data.

20. The communication NOC management system of claim 19, wherein the network equipment performance data store comprises near real-time network equipment data.

* * * * *